Figure 3:
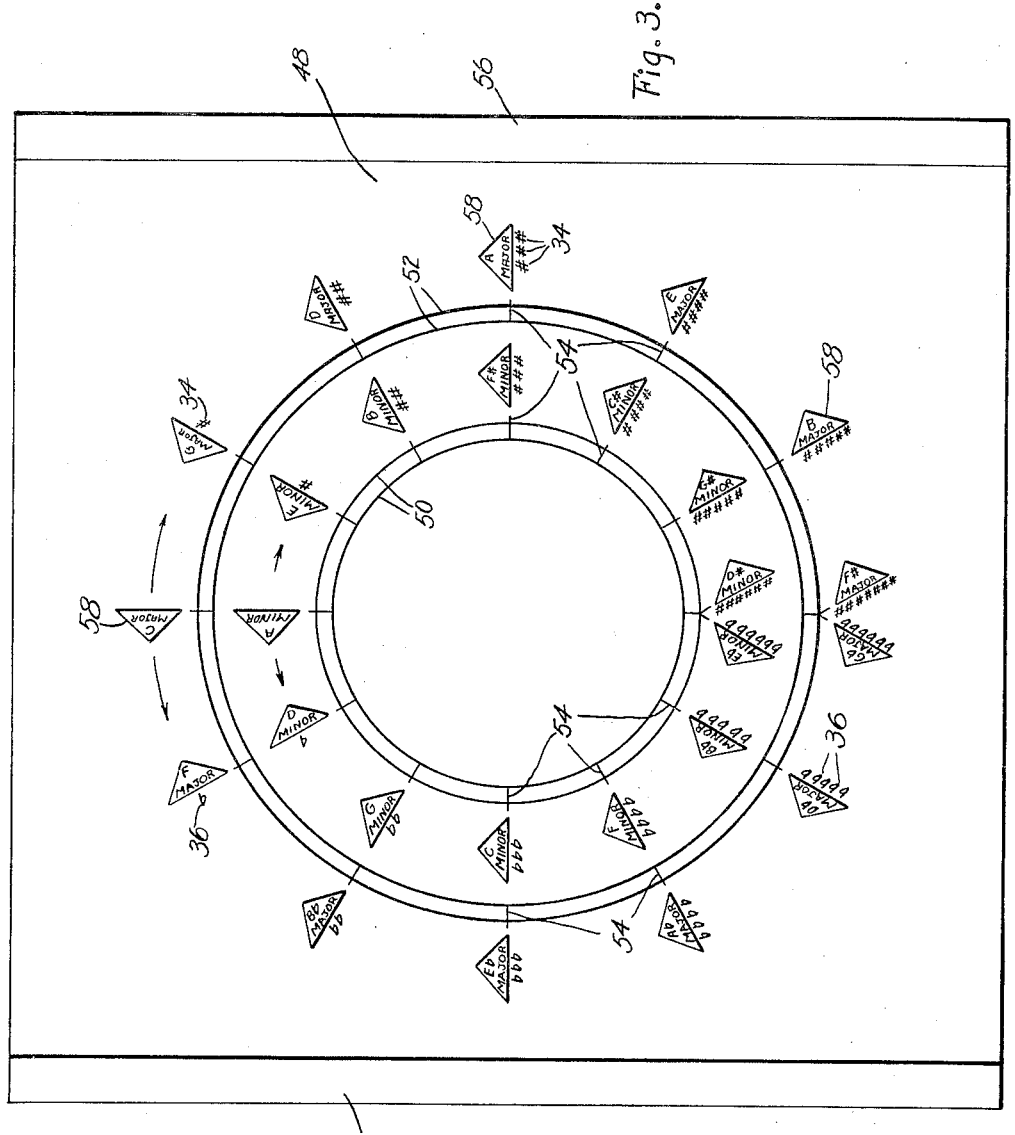

Jan. 30, 1934. K. S. GREGG 1,945,398
MUSIC READING GAME
Filed May 24, 1928 3 Sheets-Sheet 1
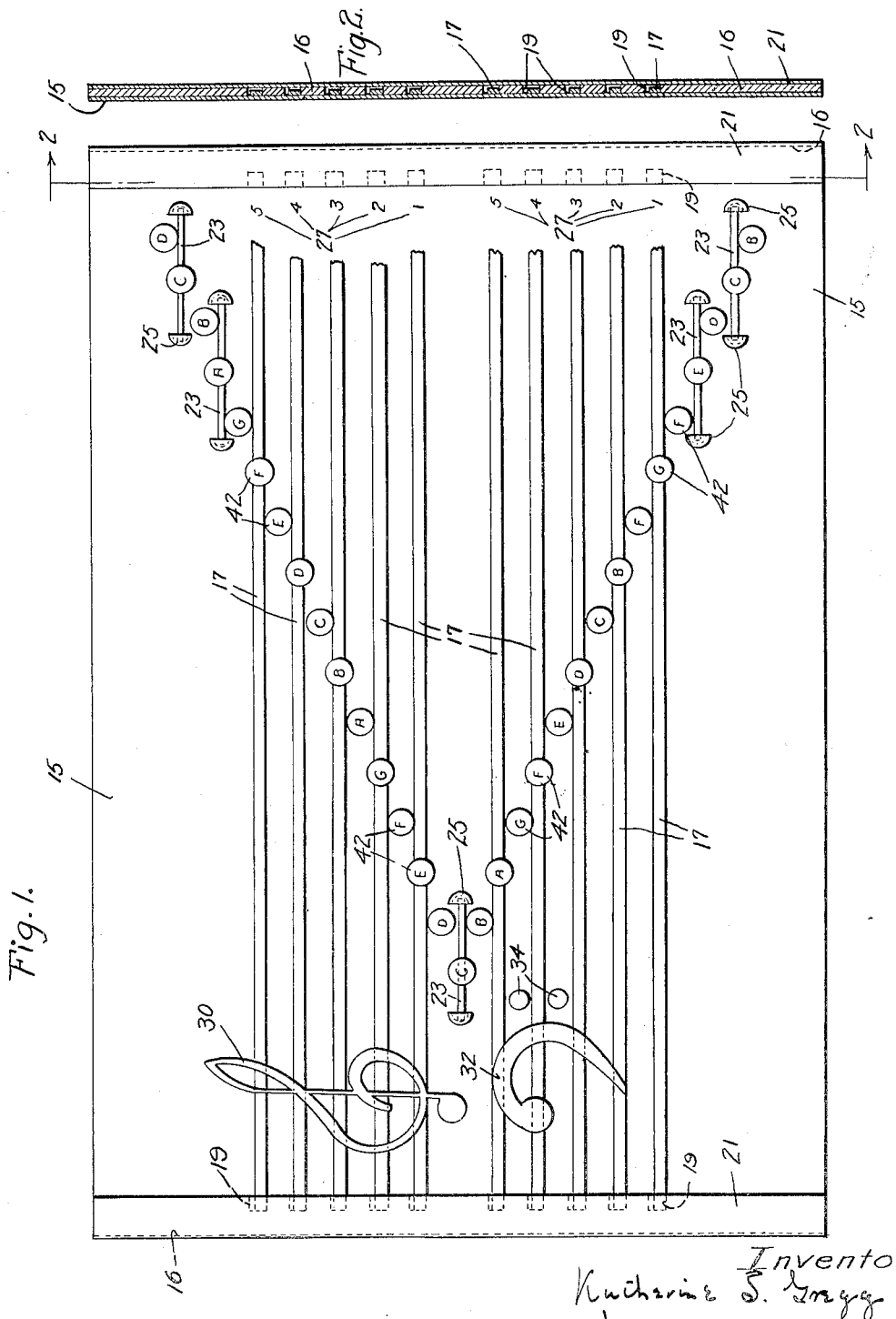

Jan. 30, 1934. K. S. GREGG 1,945,398
MUSIC READING GAME
Filed May 24, 1928 3 Sheets-Sheet 2

Inventor
Katharine S. Gregg
by [signature]
Attorney

Jan. 30, 1934.　　　K. S. GREGG　　　1,945,398
MUSIC READING GAME
Filed May 24, 1928　　　3 Sheets-Sheet 3
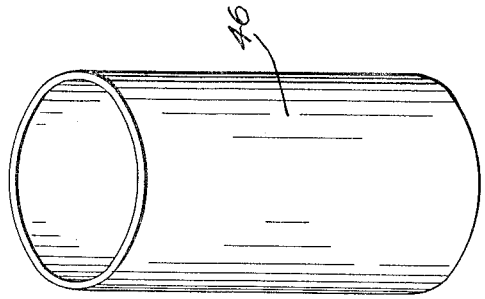
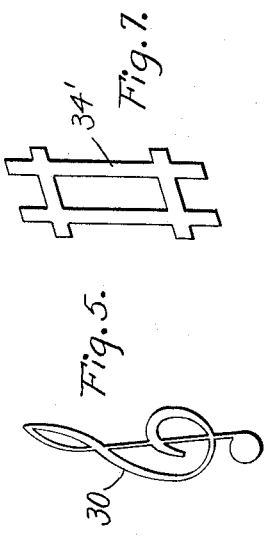
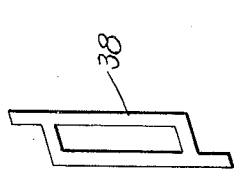
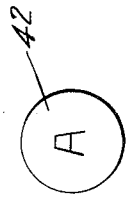
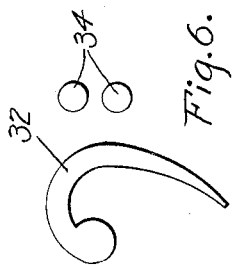
Inventor
Katherine S. Gregg
by Francis M. Dakin
Attorney Patented Jan. 30, 1934

1,945,398

UNITED STATES PATENT OFFICE 1,945,398

MUSIC READING GAME

Katharine S. Gregg, Cochituate, Mass.

Application May 24, 1928. Serial No. 280,299

3 Claims. (Cl. 84—471)

This invention relates to games and more particularly to a music reading game which, although capable of general use, is more especially designed for children.

In the art of teaching, it is well recognized that the arousing of the interest of the pupil in the subject matter is essential to the attainment of permanent results and generally if the teaching fails it is because the interest of the pupil has not been sufficiently awakened. One of the most effective methods of arousing such interest is in the use of games in which the elementary principles and knowledge of a certain art may be used as the elements of the game. The playing of such a game by a child immediately awakens, stimulates and holds its interest and if the elementary principles and knowledge of an art can be embodied in the game they remain indelibly fixed in the mind of the child and the efforts of the teacher to impart knowledge are greatly facilitated.

The main object of this invention is the production of a game suitable for young children which embodies the elementary and fundamental principles of music in order that the child may be instructed therein unconsciously while being furnished a source of entertainment.

Another object of the invention is the provision of a game of such simplicity that it is adapted for use by children in the kindergarten stage as well as in the more advanced stages.

An additional object is the provision of a game which is entertaining for children and which is attractive in form and make-up.

Other objects of the invention will be more specifically set forth and described hereinafter.

My invention contemplates a game in which the various elements used simulate the staffs and other musical symbols employed in writing music and in the playing of which the elementary and fundamental principles of musical composition constitute the rules. A suitable chart board is provided upon which the player may build up scales and other arrangements of music from the symbols provided all in accordance with the principles of music, in consequence of which the player becomes familiar with the nomenclature and the elementary principles of music. Interest is added to the game by the use of a shaper box from which musical symbols may be thrown out at random a few at a time to avoid the monotony of building up on a preconceived fixed plan. The invention also contemplates the use in conjunction with the chart-board of a second chart or board for what is known in music as the circle of keys with suitable key markers which the player uses to record the progress of the game on the chart-board.

Figure 4:
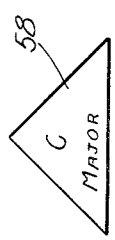

In the drawings illustrating the preferred embodiment of my invention, Figure 1 is a plan view of one form of chart-board upon which the game is played, said chart being shown with the great staff and the key of C-major set up for purposes of illustration; Fig. 2 is a sectional view of the chart-board on line 2—2 in Fig. 1 looking from left to right; Fig. 3 is a plan view of a key-board to be used in conjunction with the chart-board and provided with a circle of keys; Fig. 4 is a plan view of a key marker to be used in conjunction with the key-board; Figs. 5 to 12 inclusive are plan views of various musical symbols used in the game; Fig. 5 being the treble clef, Fig. 6 the base clef, Fig. 7 a sharp, Fig. 8 a flat, Fig. 9 a natural, Fig. 10 a double sharp, Fig. 11 a note, Fig. 12 a star for indicating notes flatted or sharped, and Fig. 13 is a view in perspective of a shaker box for throwing out various musical elements during the playing of the game.

Referring to the drawings, 15 indicates a chart-board upon which the game is played, which board may be made in any suitable manner, preferably of white enameled cloth so that it may be rolled up to small compass when not in use. It may, if desired, be made of stiff cardboard or suitable material provided with cloth joints in the middle or elsewhere so that it may be folded.

The board 15, preferably rectangular in outline, is provided with means for holding thereon ten linear members 17 simulating the lines of a music staff and one form of such means is shown consisting of pockets 19 formed in end strips 16 of wood or other suitable material which may be fastened to the board by turning its ends 21 there-around and gluing them thereto. The pockets may, however, be formed in any other suitable manner. The members 17 are preferably made of celluloid or other non-breakable material. The pockets 19 for holding the ends of the linear members 17 are arranged in groups of five so that when the said members are mounted on the chart-board, they form two musical staffs constituting a great staff as shown in Fig. 1. In addition, five short linear strips 23 are provided representing ledger lines of the scale and pockets for holding the ends of the said strips may be formed on the board 15 by pasting semi-circular tabs 25 thereon at the proper places. The pockets in the end bindings are arranged in groups of five and for the convenience of the player, the board may be marked with four groups 27 of numerals one to five to indicate the locations of the pockets and thereby facilitate the insertion of the ends of the linear members 17 therein.

A plurality of characters or symbols simulating the various musical characters required for playing the game are provided which may be formed or cut out of celluloid, cardboard or any other suitable material. These characters or symbols comprise a G or treble clef 30 and a base clef 32 including two dots 34 to be used on the treble clef and base clef respectively and a plurality of sharps 34', flats 36, naturals 38, double sharps 40 and notes 42. The form of the sharps and flats are in the usual form in which they appear on a sheet of music and the double sharps appear as a cross while the notes are in the form of circular disks inscribed with the letter of the note. The sharps may be in two sizes, the larger of which is intended for use in the signature of the key and the smaller for use on notes where required by the rules of music. In addition, a plurality of small stars 44 are required in two colors, red and blue, the red stars being used to indicate the notes which are sharped and the blue stars for notes which are flatted. Any suitable device may be used for selecting the notes in the playing of the game and one such is shown comprising a dice box 46 in which all the notes may be placed and then shaken out one or more at a time as the game progresses.

I also provide a second board 48 preferably of square form having marked or printed thereon two concentric double circles 50 and 52, each double circle having twelve radial marks 54 arranged there-around at equal intervals. This board may be made of stiff or flexible material in a similar manner to the chart-board so that it may be rolled up or folded into small compass. Preferably, however, it is made of enameled cloth with edge bindings 56. This board is intended to be used for building up on the two circles a circle of keys comprising thirteen major keys and thirteen minor keys, each key being indicated by a triangular marker 58 having printed thereon the key letter and either the word major or the word minor and these markers are arranged on the circle of keys progressively as the game is played out and serves as a record of the progress made.

In playing the game, the elementary and fundamental rules of music are followed and the child or student is first taught to arrange the linear members 17 upon the chart-board in their proper positions to form the great staff by inserting the ends thereof in their respective pockets and the same procedure is adapted for the ledger lines. In this operation, the groups of figures 27 assist in locating the pockets. After the great staff has been set up, the treble clef and base clef are properly positioned for the signature.

My invention contemplates a logical sequence in the playing of the game by the building up of scales and consequently the scale of C-major or the natural scale should be the first to be built up. Since this scale has no sharps nor flats, all the notes i. e. disks 42 (preferably thirty-one in number for that is the number required for a complete scale) are placed in the shaker box 46 and then shaken out one or more at a time and each placed in turn by the player in its appropriate place on the great staff which has been formed on the chart-board. When all the thirty-one notes have been played, the scale of C-major will appear on the chart-board as shown in Fig. 1 of the drawings. Either at the beginning or the conclusion of this part of the game, the player takes the marker 58 for C-major and places it on the key-board 48 at the top and outside of the outer double circle 52 as shown in Fig. 3.

Upon the completion of C-major scale, the player is then ready to build up the next scale in rotation which is G-major having one sharp in the signature. This key is determined by counting five notes upward from C including C which gives the note G as the name of the next scale G-major and to find the note to sharp in this scale, the player then counts upward from G seven notes which gives F having its position in the treble clef on the fifth line and in the bass clef on the fourth line. The player then places a large sharp character 34' in the signature on the fifth line of the treble clef and on the fourth line of the base clef and places adjacent each note F in the scale a red star to indicate that that note is sharped, that is assuming that the C-major scale has been left on the chart-board and is merely being transformed from the key of C-major to the key of G-major by the player. In some cases, it may be desirable to remove all the notes from the chart and to build up by the use of the shaker box each scale in turn.

The remaining major scales shown in Fig. 3 may then be built up by the same procedure, that is, by counting up five notes from the key note of the preceding scale note to get the key note of the next succeeding scale and then by counting seven from the key note of the succeeding scale to get the additional note to be sharped in that scale according to the elementary principles of music. This method is carried out as high as F-major scale, the building up of each scale being indicated by placing a marker 58 on its appropriate place on the key-board. After all the major scales having sharps have been built up on the right hand side of the key-board, then the player cleans off the chart-board, resets the scale of C-major in the usual way and proceeds to build up the scales on the left hand side of the key-board outside the double circle having flats in their signatures. Starting with the key of C-major, the player in order to determine the key letter of the next succeeding scale counts up from C including it four notes which gives F or the scale of F-major having one flat in the signature and to find the note to flat in that scale the player counts up four which is B and as it is on the third line of the treble clef and the second line on the bass clef, a large flat character 36 is placed on those locations on the two clefs, and the player then places a blue star beside B every time it appears on the great staff. A marker entitled F-major may be placed on the circle of keys. The same procedure is then followed out in building up the major keys having flats that was followed in the case of the major keys having sharps.

After all the major keys have been built up the chart may then be cleared and the minor keys may be composed in the same manner by starting with the scale of C-major and building up its corresponding minor scale which has neither sharps nor flats in the signature. To determine the name of this scale you count up six notes from C which would bring you to A indicating the name of A-minor for the scale and A as its first note. It is an elementary principle of music that the seventh note in all harmonic minor scales is sharped and in this connection in building up the minor scales it becomes necessary to use the symbols for naturals and double sharps. If the seventh note in the major scale happens to be sharped then in the corresponding minor scale a double sharp sign 40 will have to be placed beside that note wherever it happens to appear and if the seventh note in the major scale is flatted then the natural sign 38 should be placed against that note wherever it appears in the corresponding minor scale. In view of the fact that stars are used for indicating sharps and flats against the notes, the stars would be removed whenever the double sharps or the natural symbols are placed against the notes. The other minor scales for all the major scales are built up by taking a major scale, counting up six notes from the key letter of that scale to get the name of the minor scale and then counting seven notes to get the note in the minor scale which is to be sharped and that will give the corresponding minor scale for each major scale.

At the conclusion of the game the key-chart should contain all the markers shown in Fig. 3 of the drawings in the position there assigned and the pupil then knows that the game has been played to the end.

The playing of this game by a young child should be accompanied by instruction and it will undoubtedly require a number of lessons before the pupil will have mastered the rules and principles of the game but in this respect, it does not differ from other games which require time to master. It will be observed, however, that when the pupil has mastered the game, it has fixed in its mind for all time the fundamental principles and knowledge of music which are taught by the game. Although the game is designed primarily with reference to children, it is apparent that it may be used with profit by older persons both for acquiring an elementary knowledge of music and entertainment.

Although I have shown my invention as embodied in devices for building up what may be termed musical scales of thirty-one notes each, yet it is susceptible of variations from that mode of playing. For instance, if the game is to be used in a kindergarten it may be found advisable to reduce it to simpler form and to start building first scales of seven notes each before attempting to build the more complicated scales of thirty-one notes which are designed to fill all the lines and spaces of the great staff together with the five ledger lines. In short, the game may be played by the use of these devices beginning in a very elementary way using only a few notes and a few symbols and it may be gradually worked up to the game as outlined hereinbefore, progress being made as the pupil's understanding warrants.

It is to be understood that my invention is not to be limited to the precise form of construction herein shown and described since other forms of construction may be used for carrying it out without departing from the spirit thereof and within the purview of the following claims.

What I claim is:

1. A game of the class described, comprising a chart-board, a plurality of relatively thin flat linear strip members, said chart-board having end portions extending forwardly of the front face of the main part thereof and each provided with a series of pockets extending longitudinally of the chart-board to detachably hold the linear strip members spaced from each other against the front face thereof in an arrangement to simulate a musical staff, said linear strip members being normally of a length greater than the distance between said end portions of the chart-board and being flexible permitting the same to be flexed and the end portions thereof sprung into the said pockets, and a plurality of characters simulating musical notes and symbols to be associated with the staff formed by said linear strip members, said linear strip members and said board on the portions thereof between said strip members providing flat surfaces for said characters to rest upon.

2. A game of the class described, comprising a chart-board, a plurality of relatively thin flat linear strip members, said chart-board having end ear strip portions on the front face thereof, each provided with a series of pockets extending longitudinally of the chart-board to detachably hold the linear strip members spaced from each other against the front face thereof in an arrangement to simulate a musical staff, and a plurality of characters simulating musical notes and symbols to be associated with the staff formed by said linear strip members, said linear strip members and said board on the portions thereof between said strip members providing flat surfaces for said characters to rest upon.

3. In a scale building game of the character described, including a chart-board adapted to have scales built up thereon, and a second chart-board having thereon a series of marks and a plurality of marker pieces representing the various key designations and adapted to be placed upon the second chart-board as the scale building proceeds, a plurality of relatively thin flat linear strip members, said first mentioned chart-board having means for detachably holding thereon the linear strip members spaced from each other against the front face thereof in an arrangement to simulate a musical staff, and a plurality of characters simulating musical notes and symbols to be associated with the staff formed by said linear strip members, said linear strip members and said board on the portions thereof between said strip members providing flat surfaces for said characters to rest upon.

KATHARINE S. GREGG.